US006872916B2

(12) United States Patent
Carver et al.

(10) Patent No.: US 6,872,916 B2
(45) Date of Patent: *Mar. 29, 2005

(54) SYSTEM AND METHOD FOR BIOMETRIC IMAGE CAPTURING

(75) Inventors: John F. Carver, Hobe Sound, FL (US); George W. McClurg, Jensen Beach, FL (US); Joseph F. Arnold, Palm Beach Gardens, FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/235,665

(22) Filed: Sep. 6, 2002

(65) Prior Publication Data

US 2003/0089703 A1 May 15, 2003

Related U.S. Application Data

(63) Continuation-in-part of application No. 10/047,983, filed on Jan. 17, 2002.
(60) Provisional application No. 60/331,247, filed on Nov. 13, 2001.

(51) Int. Cl.$^7$ .................................. G06K 9/00
(52) U.S. Cl. .................. 219/201; 219/522; 219/543; 382/124; 62/3.2
(58) Field of Search ............................ 219/543, 201, 219/200, 522, 218; 359/831, 512, 833, 834, 837; 382/127, 124; 165/58, 61; 62/3.2

(56) References Cited

U.S. PATENT DOCUMENTS

| | | | |
|---|---|---|---|
| 3,475,588 A | 10/1969 | McMaster | |
| 3,495,259 A | 2/1970 | Martin-Gottfried et al. | |
| 3,540,025 A | 11/1970 | Levin et al. | |

(Continued)

FOREIGN PATENT DOCUMENTS

| | | | | |
|---|---|---|---|---|
| EP | 785 750 | 6/1999 | | A61B/5/117 |
| JP | 62-212892 | 9/1987 | | G06K/9/20 |
| JP | 63-137206 | * 6/1988 | | |
| JP | 1-205392 | 8/1989 | | G06K/9/00 |
| JP | 3-161884 | 7/1991 | | G06K/9/00 |
| JP | 3-194674 | 8/1991 | | G06K/9/00 |
| JP | 3-194675 | 8/1991 | | G06K/9/00 |
| SU | 1769854 A1 | 10/1992 | | |

OTHER PUBLICATIONS

English–language Abstract of Japanese Patent Publication No. 03–194674, from http://wwwl.ipdl.jpo.go.jp, 2 Pages (Aug. 26, 1991—Date of publication of application).

English–language Abstract of Japanese Patent Publication No. 03–194675, from http://wwwl.ipdl.jpo.go.jp, 2 Pages (Aug. 26, 1991—Date of publication of application).

English–language Abstract of Japanese Patent Publication No. 62–212892, from http://wwwl.ipdl.jpo.go.jp, 1 Page (Sep. 18, 1987—Date of publication of application).

(Continued)

Primary Examiner—John A. Jeffery
(74) Attorney, Agent, or Firm—Sterne, Kessler, Goldstein & Fox P.L.L.C.

(57) ABSTRACT

Biometric object image capturing systems and methods prevent undesirable interruptions of total internal reflection of a prism that result in improper biometric images. A thermal assembly comprising a plurality of thermal elements is placed adjacent to the image capturing device. The thermal elements upon supply of a current are capable of either heating or cooling the image capturing device or a platen of the image capturing device. If cooling of the biometric object receiving surface is required, the thermal elements can be controlled to decrease temperature of an area where a biometric object is placed, or an area adjacent to where the biometric object is placed. If heating of the biometric object receiving surface is required, the thermal elements can be controlled to increase temperature of an area where a biometric object is placed, or an area adjacent to where the biometric object is placed, to remove and prevent accumulation of moisture.

30 Claims, 4 Drawing Sheets

U.S. PATENT DOCUMENTS

| | | | | | |
|---|---|---|---|---|---|
| 4,336,998 | A | * | 6/1982 | Ruell | 356/71 |
| 4,358,677 | A | * | 11/1982 | Ruell et al. | 250/216 |
| 4,701,772 | A | | 10/1987 | Anderson et al. | |
| 5,230,025 | A | | 7/1993 | Fishbine et al. | |
| 5,351,127 | A | | 9/1994 | King et al. | |
| 5,467,403 | A | | 11/1995 | Fishbine et al. | |
| 5,825,474 | A | | 10/1998 | Maase | |
| 5,946,135 | A | | 8/1999 | Auerswald et al. | |
| 6,000,224 | A | * | 12/1999 | Foye | 62/3.2 |
| 2003/0012417 | A1 | | 1/2003 | Hamid | |

OTHER PUBLICATIONS

Roethenbaugh, G., *Biometrics Explained*, International Computer Security Association, ISCA, Inc., 1998, pp. 1–34.

English–language Abstract of Japanese Patent Publication No. 01–205392, from http://wwwl.ipdl.jpo.go.jp, 1 Page (Aug. 17, 1989—Date of publication of application).

English–language Abstract of Japanese Patent Publication No. 03–161884, from http://wwwl.ipdl.jpo.go.jp, 2 Pages (Jul. 11, 1991—Date of publication of application).

International Search Report, International Application No. PCT/US02/36281, mailing date: Jul. 16, 2003.

* cited by examiner

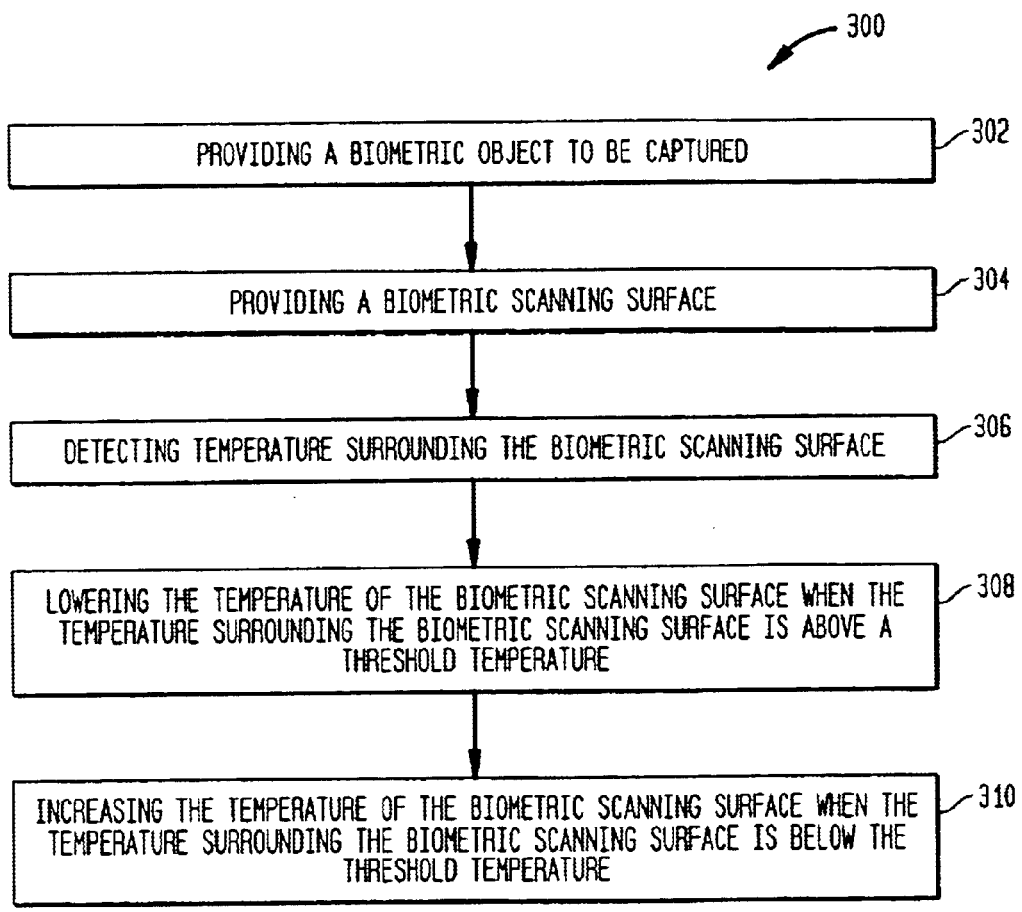

SYSTEM AND METHOD FOR BIOMETRIC IMAGE CAPTURING

CROSS-REFERENCE TO RELATED APPLICATIONS

This application is a Continuation-in-Part of U.S. application Ser. No. 10/047,983, filed Jan. 17, 2002, which is incorporated herein by reference in its entirety, which claims the benefit of provisional application No. 60/331,247, filed Nov. 13, 2001.

FIELD OF THE INVENTION

The present invention is directed to the field of biometric image capturing.

BACKGROUND OF THE INVENTION

Biometrics is the science of biological characteristic analysis. Biometric imaging captures a measurable characteristic of a human being for identification of the particular individual (for example, a fingerprint). See, for example, Gary Roethenbaugh, *Biometrics Explained*, International Computer Security Association, Inc., pp. 1–34 (1998), which is incorporated by reference herein in its entirety.

Traditionally, techniques for obtaining a biometric image have included application of ink to a person's fingertips, for instance, and rolling or simply pressing the tips of the individual's fingers to appropriate places on a recording card. This technique can be very messy due to the application of ink, and may often result in a set of prints that are difficult to read.

Today, biometric image capturing technology includes electro-optical devices for obtaining biometric data from a biometric object, such as, a finger, a palm, etc. In such instances, the electro-optical device may be a fingerprint scanner, a palm scanner, or another type of biometric scanner. These scanners are also referred to as live print scanners. Live print scanners do not require the application of ink to a person's finger or palm. Instead, live print scanners may include a prism located in an optical path. A platen is used as the surface for receiving the biometric object. For example, with an optical fingerprint scanner, a finger is placed on the platen, and a camera detects an image of the fingerprint. The platen can be a surface of the prism or any other surface provided on the prism and in optical contact with the prism. The fingerprint image detected at the camera is comprised of relatively light and dark areas. These areas correspond to the valleys and ridges of the fingerprint.

Live print scanners utilize the optical principle of total internal reflection (TIR). The rays from a light source internal to these optical scanners reach the platen at an incidence angle that causes all of the light rays to be reflected back. This occurs when the angle of incidence is equal to or greater than the critical angle, which is defined at least in part by the ratio of the two indices of refraction of the medium inside and above the surface of the platen.

In the case of a live fingerprint scanner, one or more fingers are placed on the platen for obtaining a fingerprint image. Ridges on a finger operate to alter the refraction index at the platen, thereby interrupting the TIR of the prism. This interruption in the TIR causes an optical image of the ridges and valleys of a fingerprint to be propagated through the receiving surface and captured by a camera internal to the device.

Live fingerprint scanners are increasingly being called upon to operate in a variety of ambient conditions. These conditions can vary in temperature and humidity. Different conditions can affect the quality of a detected image. Also, the particular characteristics of an individual's finger (such as whether it is dry or oily) can affect detected image quality.

For example, in certain cases, the presence of moisture and/or fluids on the finger improves the quality of a detected fingerprint image. Excessive moisture and/or fluids on a finger, however, can be undesirable. Excessive moisture and/or fluids may alter the refraction index at the receiving surface and interrupt the TIR of the prism in undesirable places on the receiving surface. This can degrade image quality. Excessive heat or cold at or near the platen surface can also degrade image quality.

What is needed is a live fingerprint scanner which can operate in a variety of ambient conditions and still capture fingerprint image at a high quality.

BRIEF SUMMARY OF THE INVENTION

The present invention relates to a thermal assembly that is capable of increasing or decreasing the temperature of a biometric object receiving surface or platen of a biometric image capturing device. Thermal elements are thermally coupled to the image capturing prism to lower the temperature of the platen. Thermal elements are controlled to decrease the temperature of the platen. To increase the temperature of the platen, the thermal elements are used to heat the platen.

In hot and dry atmospheric conditions, too little moisture may be present to detect a high quality print image. One advantage of the present invention is that the platen may be cooled in these conditions to allow high quality print image to be detected.

On the other hand, heating the platen reduces or eliminates moisture and/or fluids around the area of the platen, where the biometric object is placed Such reduction or elimination of excess moisture surrounding the biometric object on the platen prevents a halo effect from appearing in the detected print image.

In embodiments of the invention, a controller controls each thermal element to cool or heat the platen. In one embodiment, a controller supplies current to the thermal assembly in order to increase or decrease the temperature of the thermal elements. A temperature sensor, attached to the controller detects temperature of the platen. If the temperature of the platen is above a certain threshold level, the temperature sensor sends a signal to the controller to supply current to the thermal assembly in order to increase the temperature of the platen. Increasing temperature of the platen will reduce or eliminate moisture and a resulting halo effect. If the temperature of the platen is below a certain threshold level, the temperature sensor sends a signal to the controller to supply current to the thermal assembly in order to decrease the temperature of the platen.

In embodiments of the invention, the thermal elements, such as Peltier elements, are attached to the image capturing prism at locations where they do not affect the image illumination or fingerprint imaging. For example, in some embodiments, the thermal elements are located at the ends of the prism platen.

According to another feature of the present invention, the controller can be operated in a manual or automatic mode. In a manual mode, a user sets the controller to either a "cooling" or "heating" setting. The controller then controls the thermal assembly to cool or heat the platen accordingly. In an automatic mode, the controller automatically determines whether to cool or heat the platen based on detected ambient conditions (such as the ambient temperature and/or ambient humidity).

Further embodiments, features, and advantages of the present invention, as well as the structure and operation of the various embodiments of the present invention are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention.

FIG. 3 is a flowchart diagram illustrating operation of the assembly of the present invention.

Figure 1A:
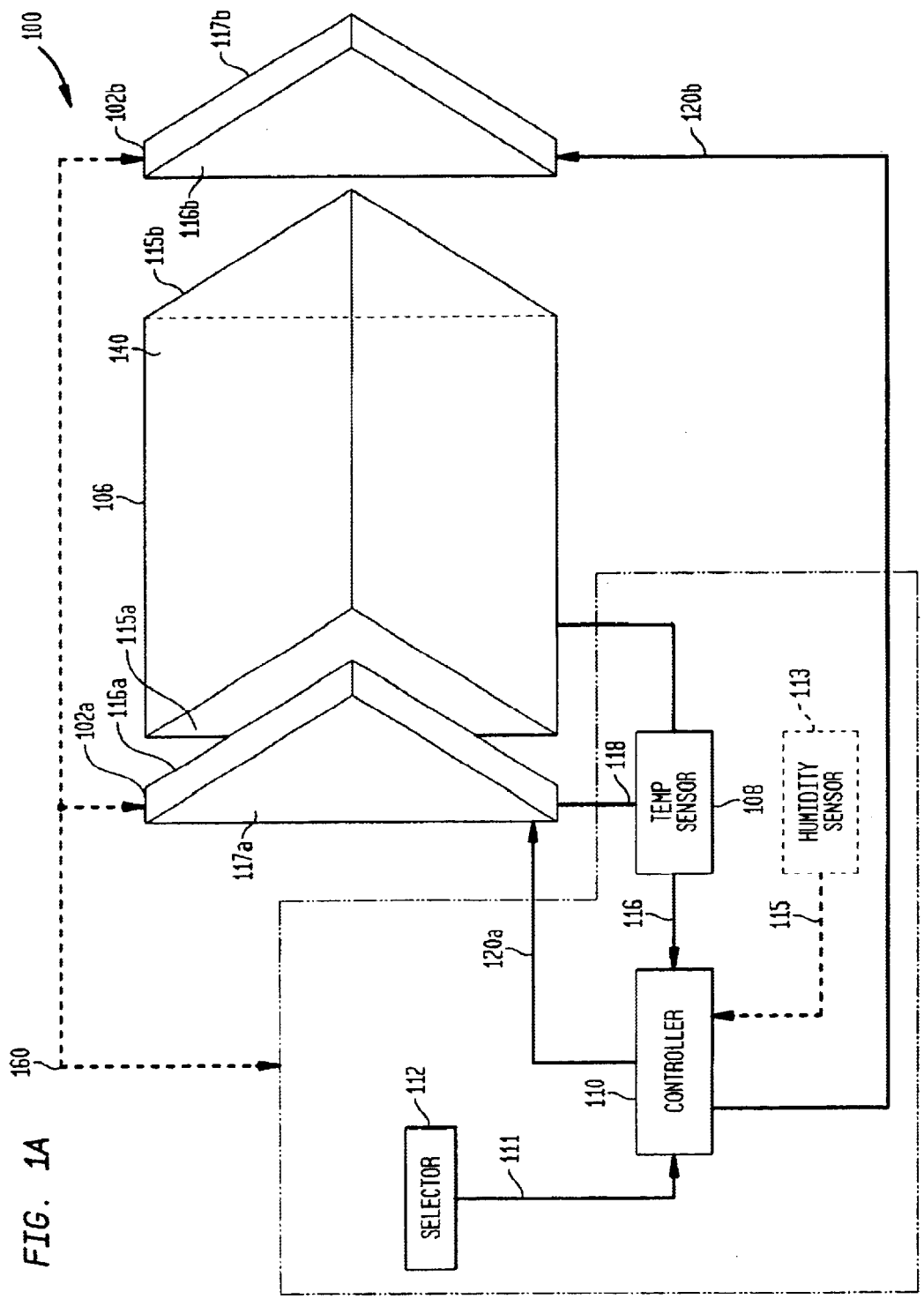
FIG. 1A is a diagram illustrating an assembly for capturing a biometric image according to an embodiment of the present invention.

The features, objects, and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Table of Contents

1. Introduction.
2. Terminology.
3. Temperature Controlled Biometric Scanner.
4. Temperature Based Controller.
   (A) Cooling.
   (B) Heating.
   (C) Automatic Control.
5. Thermal Coupling.
6. Method for Changing Temperature of the Platen.
7. Conclusion.
1. Introduction The present invention relates to systems and methods for capturing a biometric image using a live print scanning device. More specifically, the present invention relates to a live print scanner comprising an optical device coupled to a thermal assembly. The thermal assembly further comprises a controller. The controller is capable of either manually or automatically controlling temperature of the live print scanner's biometric object receiving surface or platen. In an embodiment, the controller can be used to adjust thermal states of the platen based on a variety of ambient conditions.

Although the invention will be described in terms of specific embodiments, it will be readily apparent to those skilled in the pertinent art(s) that various modifications, rearrangements and substitutions can be made without departing from the spirit of the invention. Further, while specific examples will be discussed using a fingerprint scanner for the purposes of clarity, it should be noted that the present invention is not limited to fingerprint scanners. Other types of live print scanners may be used without departing from the scope of the invention. For example, the present invention applies to any fingerprint, palmprint, or other live print scanners.

2. Terminology

To more clearly delineate the present invention, an effort is made throughout the specification to adhere to the following term definitions consistently.

The term "finger" refers to any digit on a hand including, but not limited to, a thumb, an index finger, middle finger, ring finger, or a pinky finger.

The term "live scan" refers to a scan of any type of fingerprint, print on a portion of a foot and/or palm print image made by a print scanner. A live scan can include, but is not limited to, a scan of a finger, a finger roll, a flat finger, slap print of four fingers, thumb print, palm print, foot, toe, heal of hand or a combination of fingers, such as, sets of fingers and/or thumbs from one or more hands or one or more palms disposed on a platen.

In a live scan, one or more fingers or palms from either a left hand or a right hand or both hands are placed on a platen of a scanner. Different types of print images are detected depending upon a particular application. For example, a flat print consists of a fingerprint image of a digit (finger or thumb) pressed flat against the platen. A roll print consists of an image of a digit (finger or thumb) made while the digit (finger or thumb) is rolled from one side of the digit to another side of the digit over the surface of the platen. A slap print consists of an image of four flat fingers pressed flat against the platen. A palm print involves pressing all or part of a palm upon the platen. A platen can be movable or stationary depending upon the particular type of scanner and the type of print being captured by the scanner.

The terms "biometric imaging system", "scanner", "live scanner", "live print scanner", "fingerprint scanner" and "print scanner" are used interchangeably, and refer to any type of scanner which can obtain an image of all or part of one or more fingers and/or palm in a live scan. The obtained images can be combined in any format including, but not limited to, an FBI, state, or international tenprint format.

The term "platen" refers to a component that includes an imaging surface upon which at least one finger of, palm, or portion of a hand or foot is placed during a live scan. A platen can include, but is not limited to, a surface of an optical prism, set of prisms, or set of micro-prisms, or a surface of a silicone layer or other element disposed in optical contact with a surface of an optical prism, set of prisms, or set of micro-prisms.

3. Temperature Controlled Biometric Scanner

Figure 1B:
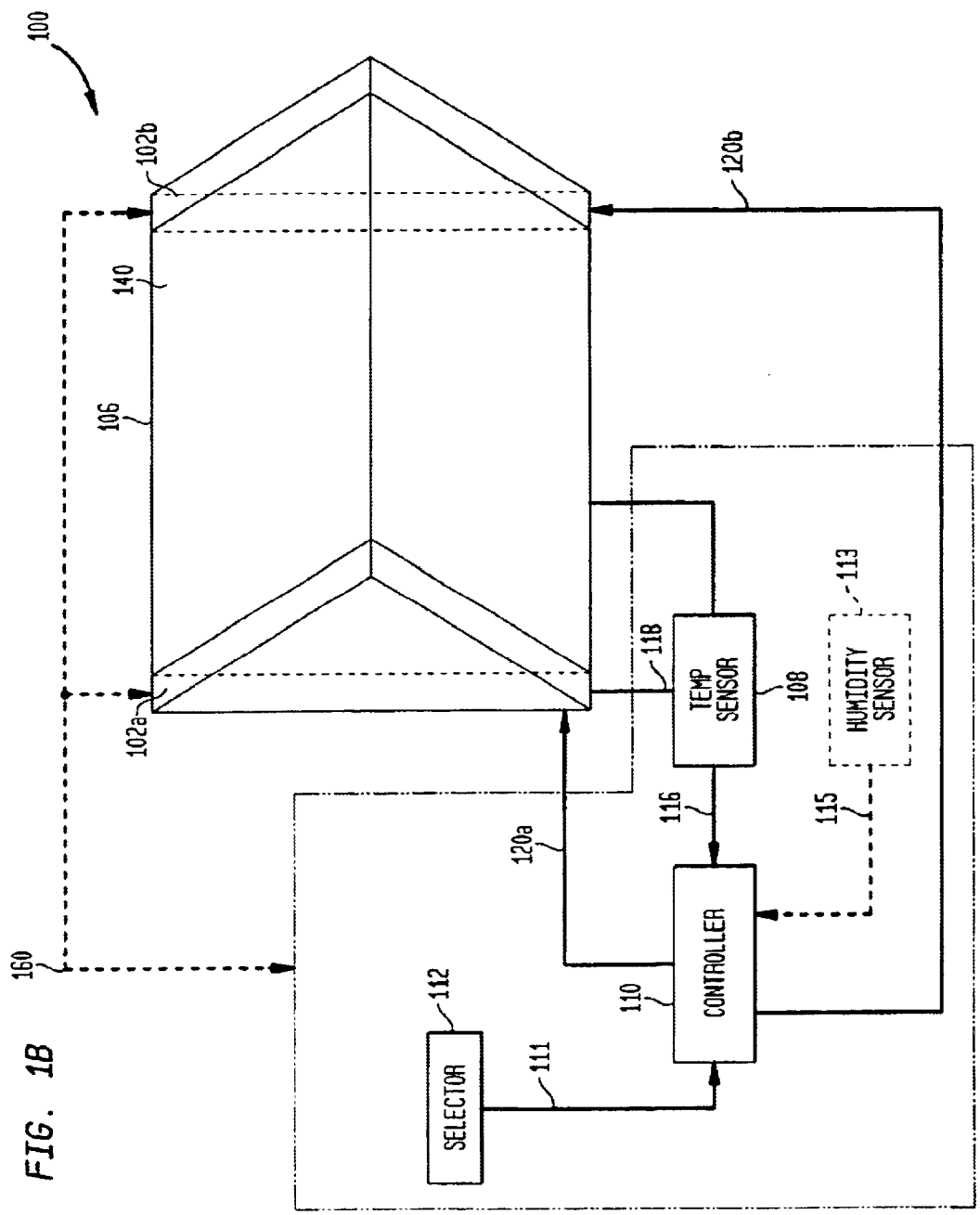
FIG. 1B is a diagram illustrating a different view of the assembly shown in FIG. 1A.

Referring to FIGS. 1A and 1B, a live print scanning system according to an embodiment of the present invention is illustrated. FIG. 1A shows a perspective exploded view of an embodiment of the present invention. FIG. 1B is another view of the embodiment shown in FIG. 1A. Referring to FIG. 1A, a live print scanning assembly 100 is shown to have an image capturing prism 106 and a thermal assembly 160, where thermal assembly 160 comprises two thermal elements 102a and 102b, controller 110, selector 112, a temperature sensor 108 and an optional humidity sensor 113.

The use of two thermal elements 102a and 102b is illustrative. The present invention is not limited to two thermal elements. In another embodiment, only one thermal element may be used. Alternatively, other embodiments of the present invention may have three or more thermal elements.

As shown in FIG. 1A, thermal elements 102a and 102b are thermally coupled to image capturing prism 106. First thermal element 102a is thermally coupled to a first side 115a of image capturing prism 106. Second thermal element 102b is thermally coupled to a second side 115b of image capturing prism 106.

First side 115a of image capturing prism 106 is shown to be opposite second side 115b of image capturing prism 106, thereby placing first thermal element 102a opposite second thermal element 102b. It is understood by one skilled in the art that any other arrangement of thermal elements 102a and 102b is possible. Also, FIG. 1A shows two thermal elements connected to image capturing prism 106, however, it is understood that any number of thermal elements can be connected to image capturing prism 106. Thermal elements 102a and 102b can be directly or indirectly attached and need only be thermally coupled to image capturing prism 106. Furthermore, image capturing prism 106 is not limited to the size and shape shown in FIG. 1A.

Connectors 120a and 120b connect thermal elements 102a and 102b to controller 110. Connector 120a connects thermal element 102a and controller 110. Similarly, connector 120b connects thermal element 102b and controller 110. Connectors 120a and 120b can be attached by any viable means known in the art to the respective thermal elements and to controller 110. In one embodiment, connectors 120a and 120b can be soldered to appropriate circuit elements of respective thermal elements 102a and 102b, as well as appropriate circuit elements of controller 110.

Temperature sensor 108 can be placed at or near image capturing prism 106. In one embodiment, temperature sensor 108 is used to detect the temperature of image capturing prism 106. In another embodiment, temperature sensor 108 is used to detect the temperature of the biometric object receiving surface or platen that can be attached to prism 106. Upon detection of temperature, temperature sensor 108 will feed the information to controller 110.

4. Temperature Based Controller

Depending on various ambient conditions surrounding live print scanning assembly 100, the temperature of a biometric object receiving surface or platen 140 of the image capturing prism 106 needs to be changed. The present invention's thermal assembly 160 comprises controller 110 and temperature sensor 108 (coupled to controller 110 and image capturing prism 106) to implement such change.

Referring to FIG. 1A, a selector 112 is coupled to controller 110 via bus 111. Selector 112 can be used to switch between modes of operation of the thermal assembly 160. In an embodiment, selector 112 may switch thermal assembly 160 between a manual heating mode, a manual cooling mode, and an automatic heating/cooling mode. It is of course understood by one skilled in the art given this description that other modes of operation of thermal assembly 160 are possible.

Figure 1C:
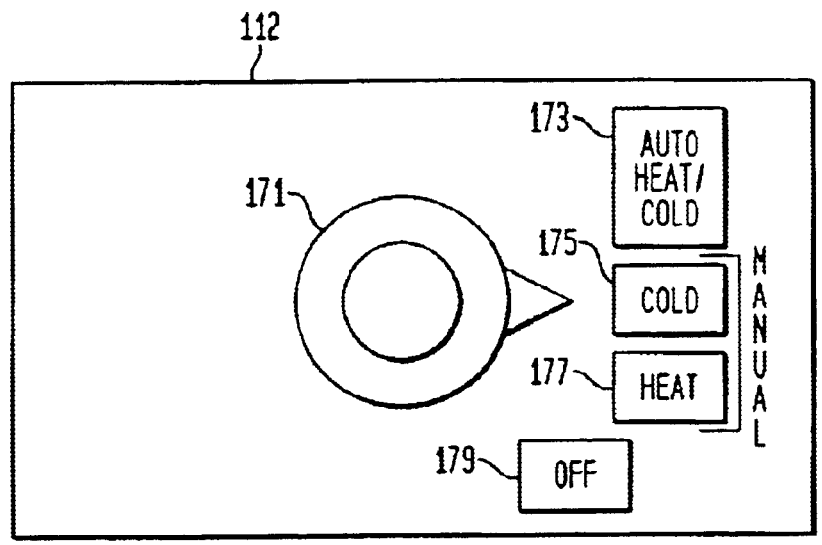
FIG. 1C is a representation of a selector illustrated in FIG. 1A that can be used to select a mode of operation of the present invention.

Referring to FIG. 1C, an embodiment of selector 112 is illustrated in more detail. Selector 112 comprises a selector switch 171 that changes the modes of operation of the thermal assembly 160. Selector 112 has a manual cooling mode 175 and a manual heating mode 177. Selector 112 also has an automatic heating/cooling mode 173. Finally, selector 112 has an off mode 179.

In manually operated cooling mode 175 and heating mode 177, the user is able to implement a change in the thermal state of platen 140. To manually heat platen 140, the user will switch selector switch 171 to heating mode 177. To manually cool platen 140, the user will switch selector switch 171 to cooling mode 175.

In an automatic heating/cooling mode, thermal assembly 160 will regulate its thermal state according to present ambient conditions. To automatically adjust temperature of platen 140, the user will shift selector switch 171 to automatic heating/cooling mode 173. Thermal assembly 160 will automatically control the temperature the platen 140.

Finally, it may be desirable to operate assembly 100 without cooling or heating platen 140. In that case, the user may shift selector switch 171 in "off" mode 179. Thermal state of platen 140 will be determined by the surrounding ambient conditions.

The following is a more detailed description of manual cooling and heating modes as well as automatic heating/cooling mode. It is understood by one skilled in the relevant art that the present invention is not limited to the modes described.

(A) Cooling

When ambient conditions surrounding live print scanning assembly 100 are hot and dry, it may be necessary to cool off the biometric object receiving surface or platen 140 of image capturing prism 106. Even though it is sometimes possible to obtain an image of a fingerprint during these conditions, excessive heat and dryness may be undesirable and may affect quality of the image. Therefore, it may be necessary to cool off the platen.

Referring to FIGS. 1A and 1C, in order for the thermal assembly 160 to decrease the temperature of platen 140, selector 112 is switched to the cooling mode. This is accomplished by shifting selector switch 171 to manual cooling mode 175. In this mode, the user is able to manually lower temperature of platen 140.

In an embodiment, the user may lower the temperature by leaving selector switch 171 in manual cooling mode 175. In this case, controller 110 will run current through thermal elements 102a and 102b, in a particular direction. Controller 110 can run current constantly or intermittently as needed based on detected temperature. By running current through thermal elements 102a and 102b this way, the temperature of platen 140 is lowered. When the current is running through thermal elements 102a and 102b in a particular manner, the side of each thermal element 102a and 102b adjacent to platen 140 becomes cold (as will be described below in more detail). By cooling sides of thermal elements 102a and 102b adjacent to platen 140, the temperature of platen 140 is decreased.

In another embodiment, in order to manually decrease the temperature of platen 140, the user may shift selector switch 171 into manual cold mode 175 and manually activate supply of current to thermal elements 102a and 102b from controller 110, whenever the temperature of platen 140 becomes unsuitable to the user. The user may use temperature data supplied by temperature sensor 108 to regulate supply of current to thermal elements 102a and 102b. In an embodiment, thermal assembly 160 may have an optional monitor (not shown) that will display temperature of platen 140.

If it appears to the user that the temperature of platen 140 became high, the user may manually activate supply of current from controller 110 to thermal elements 102a and 102b to initiate cooling. As was discussed above, when current is supplied to thermal elements 102a and 102b in a particular direction, the temperature of platen 140 is decreased to the desired level.

It is understood by one skilled in the relevant art that other methods of cooling platen 140 are possible. The following is a description of thermal elements 102a and 102b that may be used by thermal assembly 160 to lower the temperature of platen 140.

Figure 2:
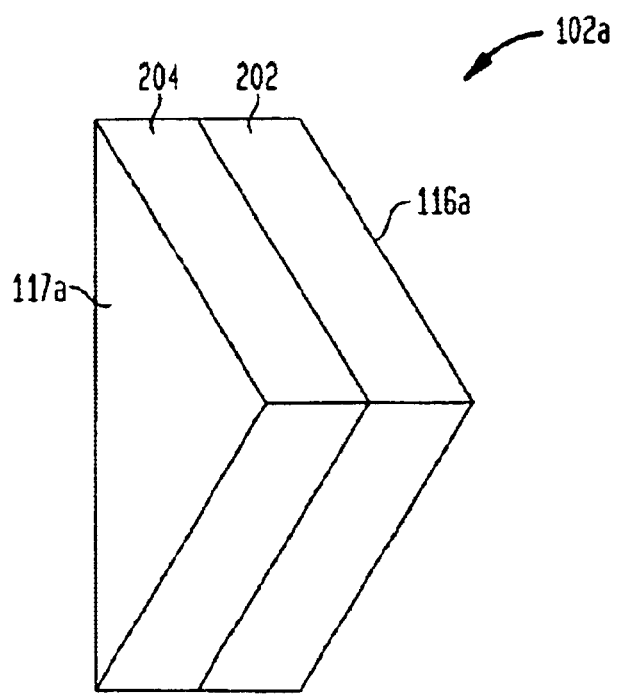
FIG. 2 is a diagram illustrating an embodiment of a thermal element attached to a surface of a prism according to an embodiment of the present invention shown in FIG. 1A.

Referring to FIG. 2, first thermal element 102a is shown. The structure and operation of second thermal element 102b is similar to the structure and operation of first thermal element 102a. First thermal element 102a has a first portion 202 and a second portion 204. First portion 202 is coupled to second portion 204. A first side 116a of first thermal element 102a is an outer side of first portion 202 and a second side 117a of first thermal element 102a is the outer side of second portion 204.

Thermal element 102a is constructed in a way so that if a current is passed through the thermal element one way, first portion 202 will start removing heat. At the same time, second portion 204 will absorb the amount of energy required to lower the temperature of first portion 202. By absorbing energy this way, the temperature of second portion 204 of thermal element 102a will rise.

However, if the current is passed through the thermal element in a reverse fashion, first portion 202 will start generating heat. In this case, second portion 204 of thermal element 102a will start removing heat. At the same time, first portion 202 will absorb energy from second portion 204. This will increase temperature of first portion 202.

As was mentioned above, the structure and operation of second thermal element 102b is similar to the structure and operation of first thermal element 102a.

In an embodiment, thermal elements 102a and 102b may be Peltier elements. Peltier elements are bidirectional heating and cooling devices. When current is applied in one direction, the Peltier element acts as a cooling element (also called a heat sink) as it pumps heat out. When current is applied in the opposite direction, the Peltier element acts to generate heat.

(B) Heating

Under certain ambient conditions, the air in the microscopic vicinity of the fingerprint has a very high relative humidity. If the water contacts the surface of the prism, it will break the TIR of the prism. This interruption in the TIR causes an optical image of the water on the platen (e.g., a halo that is known in the relevant art as a halo effect) to be propagated through the platen and captured by a camera internal to the device. This interruption in the TIR results in an undesirable visible image of the water in the image of the biometric object.

Therefore, it may be desirable to raise the temperature of the platen to counter the effect of moisture, fluids and/or water deposited on the surface of the prism. By raising temperature of platen 140, it is possible to evaporate moisture accumulated on the platen, thereby increasing image quality and preventing a "halo" effect.

To increase the temperature of platen 140, the user may follow steps similar to the cooling process described above. Referring to FIGS. 1A and 1C, in order for the thermal assembly 160 to increase the temperature of platen 140, selector 112 is switched to the heating mode. This is accomplished by shifting selector switch 171 to manual heating mode 177. In this mode, the user is able to manually increase temperature of platen 140.

In an embodiment, the user may increase the temperature by leaving selector switch 171 in manual heating mode 177. In this case, controller 110 will run current through thermal elements 102a and 102b, in a direction opposite the current's direction in the cooling mode. Controller 110 can run current constantly or intermittently as needed based on detected temperature. By running current through thermal elements 102a and 102b in an opposite way, the temperature of platen 140 is increased. Thermal elements 102a and 102b become heating elements. The sides of thermal elements 102a and 102b adjacent to platen 140 have now increased in temperature. This is opposite of the cooling mode, where these sides were cooling platen 140. By heating thermal elements 102a and 102b sides adjacent to platen 140, the temperature of platen 140 is increased.

In another embodiment, in order to manually increase the temperature of platen 140, the user may shift selector switch 171 into manual heating mode 177 and activate supply of current to thermal elements 102a and 102b from controller 110 whenever the temperature of platen 140 becomes undesirably low. The user may use temperature data supplied to the user by temperature sensor 108 to regulate supply of current to thermal elements 102a and 102b. In an embodiment, thermal assembly 160 may have an optional monitor (not shown) that will display temperature of platen 140.

If it appears to the user that the temperature of platen 140 became low enough, the user may manually activate supply of current from controller 110 to thermal elements 102. As was discussed above, when current is supplied to thermal elements 102 in a direction opposite the direction of current in the cooling mode, the temperature of platen 140 is increased to the desired level.

When a lot of moisture is present on the biometric object to be scanned, increasing the temperature of platen 140 will remove the excess moisture from the object and platen 140. By removing excess moisture from platen 140, the image quality of the object is improved and the "halo" effect is eliminated.

Referring back to FIG. 1A, an optional humidity sensor 113 is shown. Humidity sensor 113 is coupled via bus 115 to controller 110. Sensor 113 detects humidity coefficient and sends the data to controller 110. A purpose of humidity sensor 113 is to provide additional information to controller 110. Upon increasing humidity, controller 110 may increase supply of current to thermal elements 102a and 102b, so as to further eliminate moisture from platen 140. Upon decreasing humidity, controller 110 may decrease supply of current to thermal elements 102a and 102b.

It is understood by one skilled in the relevant art that other methods of heating platen 140 are possible. Thermal elements 102a and 102b may be the same thermal elements that are used when cooling platen 140. However, separate thermal elements may be thermally coupled to platen 140 in order to heat the platen.

(C) Automatic Control

Referring to FIGS. 1A–1C, the present invention's thermal assembly 160 is capable of operating in an automatic heating/cooling mode 173. In this mode, thermal assembly 160 is capable of automatically controlling either heating or cooling of platen 140. Thermal assembly 160 will heat platen 140 when moisture is present. Thermal assembly 160 will cool platen 140 when the surrounding ambient conditions are hot and dry.

To implement automatic heating/cooling, the thermal assembly 160 needs to be switched to automatic heating/cooling mode 173, as shown in FIG. 1C. Selector switch 171 is shifted into position 173.

In an embodiment, thermal assembly 160 will heat platen 140 when the temperature of platen 140 drops below a low or first threshold level. Likewise, thermal assembly 160 will cool platen 140 when the temperature of platen 140 rises above a high or second threshold level. It is understood by one skilled in the relevant art that in both heating and cooling, a range of temperature thresholds may be preset below or above which thermal assembly 160 would appropriately respond. In another embodiment, a user may set up a plurality of temperature thresholds, whereupon reaching each threshold thermal assembly 160 would take appropriate adjustments in the temperature of platen 140.

In the automatic mode, temperature sensor 108 coupled to controller 110 via bus 116 detects the temperature of platen 140. When the ambient conditions surrounding live print scanning assembly 100 are hot and dry, the platen's temperature will rise. Temperature sensor 108 detects new temperature of platen 140 and sends the data to controller 110.

Depending on the ambient conditions and the temperature of platen 140, controller 110 will act to either increase or decrease the temperature of platen 140. If the temperature of platen 140 has reached the high threshold, then controller 110 will direct the current via connectors 120a and 120b to thermal elements 102a and 102b, respectively, in a direction opposite the current's direction in the heating mode. Thermal elements 102a and 102b will act as platen coolers and lower temperature of platen 140, as was described above.

If the temperature of platen 140 has reached the low threshold, then controller 110 will direct the current via connectors 120a and 120b to thermal elements 102a and 102b, respectively, in a direction opposite current's direction in the cooling mode. Thermal elements 102a and 102b will act as platen heaters and raise the temperature of platen 140, as was described above.

Temperature sensor 108 detects the temperature of platen 140 and thermal elements 102a and 102b via respective busses 116 and 118. When the cold dissipated in platen 140 causes image capturing prism 106 to obtain the temperature low enough to prevent overheating of prism 106, controller 110 adjusts its generation of current to thermal elements 102a and 102b. Upon sensing that the temperature of platen 140 has gone above a specified level, controller 110 generates enough power to cause the temperature to decrease.

On the other hand, when a lot of moisture is present on a biometric object to be scanned, it may be necessary to increase the temperature of platen 140 in order to remove the excess moisture from the object and platen 140. Therefore, to increase the temperature of platen 140, first sides 116a and 116b of first and second thermal elements 102a and 102b, respectively, become hot. This is achieved when controller 110 is passing current through the connectors 120a and 120b in a direction opposite the direction, when cooling image capturing prism 106. By having thermal elements 102a and 102b apply heat to image capturing prism 106, the temperature of platen 140 is increased.

It is understood by one skilled in the relevant art that the automatic control of heating/cooling in the present invention is not limited to the embodiments described above. The above-described embodiments operate with two thermal elements 102a and 102b coupled to platen 140 of image capturing prism 106. However, it is understood that at least one thermal element is needed to heat or cool platen 140.

The following is a description of how thermal elements 102a and 102b are coupled to platen 140 in a particular embodiment.

5. Thermal Coupling

The present invention uses two thermal elements 102a and 102b to uniformly increase or decrease the temperature of platen 140. To achieve uniform change in temperature, thermal elements 102a and 102b are thermally coupled to platen 140. However, at least one thermal element is necessary to increase or decrease the temperature of the platen.

Referring to FIGS. 1A and 1B, first thermal element 102a has first side 116a and second side 117a. First side 116a of thermal element 102a is an inner side with respect to image capturing prism 106 (or platen 140). First side 116a is coupled to first side 115a of image capturing prism 106 (or platen 140). Second side 117a of thermal element 102a is an outer side with respect to image capturing prism 106 (or platen 140). Connector 120a connects controller 110 and second side 117a. First side 116a of thermal element 102a is attached to first side 115a of image capturing prism 106 (or platen 140) by any conventionally known means. In one example, such means may be epoxy or other adhesive elements.

Similarly, thermal element 102b has a first side 116b and a second side 117b. First side 116b of thermal element 102b is an inner side with respect to image capturing prism 106 (or platen 140). First side 116b is attached to second side 115b of image capturing prism 106 (or platen 140). Second side 117b of thermal element 102b is an outer side with respect to image capturing prism 106 (or platen 140). Connector 120b connects controller 110 and second side 117b. First side 116b of thermal element 102b is attached to second side 115b of image capturing prism 106 (or platen 140) by any conventionally known means. In one example, such means may be epoxy or other adhesive elements.

By coupling thermal elements 102a and 102b to opposite sides of platen 140 or image capturing prism 106, thermal elements are able to either uniformly increase or uniformly decrease the temperature of image capturing prism 106 or platen 140.

In an embodiment, the image capturing prism 106 is an optical device made of a light propagating material such as plastic, glass, or a combination thereof. The light propagating material is characterized by an index of refraction. Prism 106 is designed to utilize the optical principle of total internal reflection. The operation of a prism in a fingerprint scanner is further described in U.S. Pat. No. 5,467,403, to Fishbine et al., entitled "Portable Fingerprint Scanning Apparatus for Identification Verification" issued on Nov. 14, 1995 to Digital Biometrics, Inc. and incorporated herein by reference in its entirety.

6. Method for Changing the Temperature of the Platen

Referring to FIG. 3, a method 300 for changing temperature of platen 140 is illustrated. In step 302, a biometric object to be scanned is provided (e.g., a finger). The biometric object is then applied to platen 140 of image capturing prism 106. In an embodiment, the biometric object may be placed atop of platen 140. Platen 140 can be a top surface of image capturing prism 106. However, in another embodiment, platen 140 may be a protective cover placed in optical contact with a surface of image capturing prism 106.

In step 306, method 300 proceeds to detect the temperature of platen 140 using temperature sensor 108. Temperature sensor 108 sends the temperature data to controller 110. Controller 110 runs the current in one direction when there is a need to cool image capturing prism 106 and/or platen 140. Controller 110 runs the current in the other direction when there is a need to heat platen 140.

Referring to step 308, if the conditions surrounding platen 140 are hot and dry, then there is a need to decrease temperature of platen 140. By decreasing the temperature of platen 140, image capturing prism 106 is not overheated.

If temperature sensor 108 detects that the temperature of platen 140 is above a certain threshold level, then controller 110 will generate current in order to decrease the temperature of platen 140. The current is sent via connectors 120a and 120b to thermal elements 102a and 102b, respectively. Here the current is sent in a particular direction. Because, there is a need to decrease the temperature of platen 140, thermal elements 102a and 102b will remove heat.

Referring now to step 310, if an excess moisture is present on the biometric object and/or platen 140, there is a need to increase the temperature of platen 140. By increasing the temperature of platen 140, the excess moisture is evaporated. By eliminating the excess moisture, the halo effect is reduced.

If temperature sensor 108 detects that the temperature of platen 140 is below a certain threshold level, then controller 110 will generate current in order to increase the temperature of platen 140. The current is sent via connectors 120a and 120b to thermal elements 102a and 102b, respectively. The current is sent in a direction opposite the current's direction when image capturing prism 106 or platen 140 need to be cooled. Because, there is a need to increase the temperature of platen 140, thermal elements 102a and 102b will generate heat.

7. Conclusion

The present invention is not limited to the above described modes of operation. It is understood by one skilled in the art that other modes of operation are possible.

The present invention is not limited to a single temperature threshold in the case of either heating and/or cooling platen 140. Additional thresholds can be used if more fine control of heating and/or cooling is desired. In another embodiment, temperature sensor 108 can be omitted entirely so that a constant heating and/or constant cooling of the biometric object receiving surface is provided, regardless of temperature changes. Finally, the threshold values of temperature values for heating and cooling can be set as desired, as will become apparent to a person skilled in the relevant art given the description of the present invention.

Furthermore, it is understood by a person skilled in the relevant art, that controller 110 can have a current source and a switching circuit. The switching circuit would control direction of the current supplied to thermal elements 102a and 102b via connectors 120a and 120b. Other embodiments of the controller 110 are possible and may be implemented as desired.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. A live print scanner, comprising:
   a platen upon which a biometric object being scanned can be placed and from which an image of a ridged print pattern can be captured through total internal reflection at the platen;
   at least one thermal element thermally coupled to said platen, wherein said at least one thermal element is capable of adding and removing heat from said platen; and
   a controller that controls said at least one thermal element to add or remove heat from said platen based on a detected ambient condition.

2. The live print scanner of claim 1, wherein the scanner further comprises a temperature sensor coupled to said at least one thermal element and said controller, wherein said temperature sensor detects temperature of said platen.

3. The live print scanner of claim 1, wherein said controller regulates temperature of said platen.

4. The live print scanner of claim 1, wherein the scanner further comprises a prism wherein said prism is in optical contact with said platen and is thermally coupled to said at least one thermal element and to said platen.

5. The live print scanner of claim 1, wherein said at least one thermal element comprises a first thermal element and a second thermal element, and wherein said first thermal element is thermally coupled to said platen and said second thermal element is thermally coupled to said platen.

6. The live print scanner of claim 5, wherein said first thermal element removes heat from said platen.

7. The live print scanner of claim 5, wherein said second thermal element adds heat to said platen.

8. The live print scanner of claim 1, wherein said platen further comprises a surface of a prism.

9. The live print scanner of claim 1, wherein said controller controls said at least one thermal element to add or remove heat in response to a manual control input, whereby a user can select whether said platen is cooled or heated depending upon an ambient condition.

10. The live print scanner of claim 1, wherein said controller automatically controls said at least one thermal element to add or remove heat based on a detected ambient condition.

11. The live print scanner of claim 1, wherein said controller includes a selector switch whereby a user can set said controller to control said at least one thermal element to either add or remove heat to or from said platen.

12. The live print scanner of claim 1, wherein the scanner further comprises a humidity sensor that detects humidity in an area at or near said platen and provides a signal representative of the detected humidity to said controller.

13. The apparatus of claim 1, wherein said at least one thermal element is a Peltier element.

14. A method for enhancing biometric image capture of ridged print patterns on a biometric object, comprising the steps of:
   (a) detecting an ambient temperature surrounding a biometric scanning surface from which an image of a ridged print pattern can be captured through total internal reflection at the biometric scanning surface; and
   (b) lowering the temperature of the biometric scanning surface with at least one thermal element when the detected ambient temperature is above a first threshold temperature.

15. The method of clam 14, wherein said step (b) further comprises generating current in a first direction through the at least one thermal element near the biometric scanning surface to lower the temperature of the biometric scanning surface.

16. The method of claim 14, wherein the method further comprises a step of:
   (c) increasing the temperature of the biometric scanning surface when the detected ambient temperature is below a second threshold temperature.

17. The method of claim 16, wherein said step (c) further comprises generating current in a second direction through the at least one thermal element near the biometric scanning surface to increase the temperature of the biometric scanning surface.

18. A method for cooling a biometric scanning surface of a live print scanning device for capturing ridged print patterns of a biometric object, said live print scanning device having a thermal assembly thermally coupled to the biometric scanning surface, comprising the steps of:

(a) generating a control signal using the thermal assembly, wherein the control signal is representative of a decrease in temperature of the biometric scanning surface; and (b) decreasing the temperature of the biometric scanning surface with at least one thermal element in the thermal assembly in response to the control signal.

19. The method of claim 18, further comprising the step:

(c) monitoring temperature in the biometric scanning surface to maintain the temperature at a desired level suitable for preventing overheating of the biometric scanning surface.

20. A method for enhancing biometric image capture using an image capturing device having a biometric object receiving surface for receiving a biometric object, comprising the steps of:

(a) detecting temperature of the biometric object receiving surface;

(b) generating current from a power source in a thermal element assembly coupled to the image capturing device;

(c) decreasing temperature of the biometric object receiving surface with at least one thermal element in the thermal element assembly to prevent overheating of the image capturing device when the biometric object receiving surface temperature is above a first threshold temperature; and (d) increasing temperature of the biometric object receiving surface to eliminate excess moisture from the image capturing device when the biometric object receiving surface temperature is below a second threshold temperature.

21. The method of claim 20, further comprising the step of:

(e) monitoring temperature in the biometric object receiving surface to maintain the temperature at a desired level suitable for preventing overheating of the biometric object receiving surface.

22. The method of claim 20, further comprising the step of:

(e) monitoring the temperature of the biometric object receiving surface to maintain temperature at a desired level suitable for eliminating additional moisture near a biometric object placed on the biometric object receiving surface.

23. A method of changing a thermal state of a biometric scanning surface of a live print scanning device having a thermal assembly with at least one thermal element capable of adding and removing heat and thermally coupled to the biometric scanning surface, comprising the steps of:

(a) generating at least one control signal using the thermal assembly, wherein the at least one control signal is representative of change in thermal state of the biometric scanning surface; and (b) changing the thermal state of the biometric scanning surface with the at least one thermal element in response to the at least one control signal to a thermal state which enhances capture of ridged print patterns.

24. The method of claim 23, wherein said step (b) further comprises changing temperature of the biometric scanning surface in response to at least one control signal.

25. The method of claim 23, wherein said step (a) further comprises generating at least one control signal representative of a decrease in temperature of the biometric scanning surface.

26. The method of claim 23, wherein said step (a) further comprises generating at least one control signal representative of an increase in temperature of the biometric scanning surface.

27. A live print scanner, comprising:

a platen from which an image of a ridged print pattern of a biometric object can be captured through total internal reflection at the platen;

at least one thermal element thermally coupled to said platen, wherein said at least one thermal element removes heat from said platen; and a controller that controls said at least one thermal element to remove heat from said platen depending on a particular sensed condition.

28. The live print scanner of claim 27, wherein said scanner further comprises a temperature sensor coupled to said at least one thermal element and said controller, wherein said temperature sensor detects a temperature of said platen.

29. The live print scanner of claim 27, wherein said controller regulates a temperature of said platen.

30. The live print scanner of claim 27, wherein said at least one thermal element is a Peltier element.

* * * * *